US010728383B1

(12) United States Patent
Parampottil et al.

(10) Patent No.: US 10,728,383 B1
(45) Date of Patent: Jul. 28, 2020

(54) CONTROLLED-ENVIRONMENT FACILITY RESIDENT PATTERN ELECTRONIC COMMUNICATION DETECTION AND CONTROLLED-ENVIRONMENT FACILITY ACTION

(71) Applicant: Securus Technologies, Inc., Carrollton, TX (US)

(72) Inventors: Isaac Parampottil, Coppell, TX (US); Christopher Barrett Bruton, Frisco, TX (US); Mark Lester, Roanoke, TX (US); David McTee, Hurst, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 16/459,526

(22) Filed: Jul. 1, 2019

(51) Int. Cl.
*H04M 3/22* (2006.01)
*H04M 15/00* (2006.01)
*G06Q 50/26* (2012.01)
*H04M 3/42* (2006.01)

(52) U.S. Cl.
CPC .......... *H04M 3/2281* (2013.01); *G06Q 50/26* (2013.01); *H04M 3/42144* (2013.01); *H04M 15/85* (2013.01); *H04M 2215/7833* (2013.01)

(58) Field of Classification Search
CPC combination set(s) only.
See application file for complete search history.

(56) References Cited

U.S. PATENT DOCUMENTS

| 2005/0021649 | A1* | 1/2005 | Goodman | G06F 21/316 709/207 |
| 2016/0164895 | A1* | 6/2016 | Satish | H04L 63/0236 726/1 |

OTHER PUBLICATIONS

Detecting and Classifying anomalous behavior in spatiotemporal network, William Chad Young, 2014, pp. 1-5 (Year: 2014).*

* cited by examiner

*Primary Examiner* — Duc Nguyen
*Assistant Examiner* — Assad Mohammed
(74) *Attorney, Agent, or Firm* — Fogarty LLP

(57) ABSTRACT

Controlled-environment facility resident pattern electronic communication detection systems and methods may employ a controlled-environment facility secure communication platform, an investigative data aggregation and analysis system, and/or the like. Controlled-environment facility individual resident outgoing electronic communication velocity is monitored. The individual resident outgoing electronic communication velocity may be the number of electronic communications placed by a controlled-environment facility resident, to telephone numbers and/or electronic communication addresses over a period of time. A sharp increase in outgoing electronic communication velocity for a particular controlled-environment facility resident over a relatively short period of time may be recognized and controlled-environment facility personnel of a controlled-environment facility in which the particular controlled-environment facility resident resides may be alerted that the particular resident is at risk of imminent danger, such as suicide, in response to recognition of the sharp increase in outgoing electronic communication velocity for the particular resident over the relatively short period of time.

22 Claims, 3 Drawing Sheets

CONTROLLED-ENVIRONMENT FACILITY RESIDENT PATTERN ELECTRONIC COMMUNICATION DETECTION AND CONTROLLED-ENVIRONMENT FACILITY ACTION

TECHNICAL FIELD

The present disclosure relates generally to controlled-environment facilities, more particularly to electronic communications initiated by controlled-environment facility residents, and specifically to controlled-environment facility resident pattern electronic communication detection and controlled-environment facility action taken in response thereto.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences, which may be typically referred to as "video visitation," and online chat sessions.

Traditional communication services provide residents of controlled-environment facilities (such as correctional facilities) including allowing residents (inmates) to place outbound electronic communications to non-residents of the controlled-environment facility. Other types of communication available to controlled-environment residents include the ability to exchange email and canned text messages between residents and non-residents of the controlled-environment facility. Basically, all of these forms of communication aim to facilitate communication between a resident of a controlled-environment facility and a non-resident.

Additionally, over the past several years, the above-mentioned sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often unable to perform investigations, or other monitoring, with respect to their own inmates.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide controlled-environment facility resident pattern electronic communication detection. Therein a controlled-environment facility secure communication platform (comprising at least one controlled-environment facility communication processing system and/or at least one controlled-environment facility administration management system), an investigative data aggregation and analysis system, and/or the like, monitors controlled-environment facility individual resident outgoing electronic communication velocity. The individual resident outgoing electronic communication velocity may include the number of electronic communications placed by a resident, to telephone numbers and/or electronic communication addresses over a period of time. The telephone numbers and/or electronic communication addresses may be telephone numbers and/or electronic communication addresses from a Pre-Approved Contact (PAC) list, a Pre-Approved Number (PAN) list, and/or a Pre-Authorized Video List (PVL) of the particular controlled-environment facility resident, such as may be maintained by a controlled-environment facility administration management system.

The controlled-environment facility secure communication platform, investigative data aggregation and analysis system, and/or the like, recognizes a sharp increase in outgoing electronic communication velocity for a particular controlled-environment facility resident over a relatively short period of time. The controlled-environment facility secure communication platform, investigative data aggregation and analysis system, and/or the like, may also record electronic communications in which controlled-environment facility residents are a party, and review, in response to recognition of the sharp increase in outgoing electronic communication velocity for the particular resident over the relatively short period of time, recordings of the outgoing electronic communications the particular resident placed over the relatively short period of time for one or more keywords indicative of the particular resident being at risk of imminent danger and/or tone of the particular resident indicative of the particular resident being at risk of imminent danger. Such a review of recordings of the outgoing electronic communications the particular resident placed for tone of the particular resident may include analyzing audio of the recordings of the outgoing electronic communications to detect a change in an audio volume level of the audio that indicates an occurrence of a potential event of interest indicative of a risk of imminent danger.

The controlled-environment facility secure communication platform, investigative data aggregation and analysis system, and/or the like, alerts controlled-environment facility personnel of a controlled-environment facility in which the particular controlled-environment facility resident resides that the particular resident is at risk of imminent danger, such as imminent danger of suicide, in response to recognition of the sharp increase in outgoing electronic communication velocity for the particular resident over the relatively short period of time. The controlled-environment facility secure communication platform, investigative data aggregation and analysis system, and/or the like, may, as at least a part of the alert, display an index of likelihood of imminent danger by the particular resident, based at least in part on a volume and/or velocity of the outgoing electronic communications placed by the particular resident over the relatively short period of time and/or, based at least in part on a percentage of a pre-approved contact list of the particular resident that the particular resident has initiated electronic communications with over the relatively short period of time.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
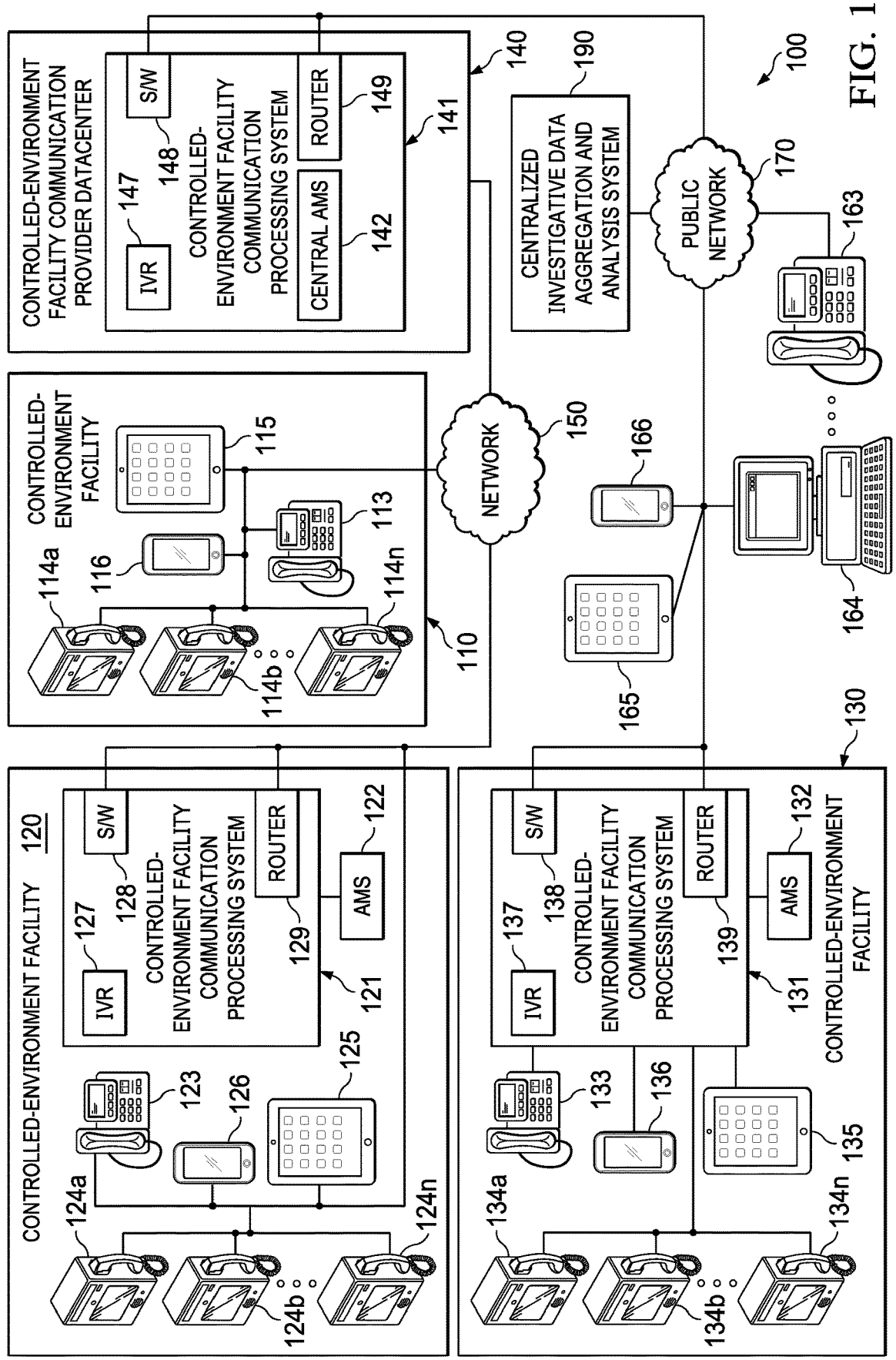
Figure 2:
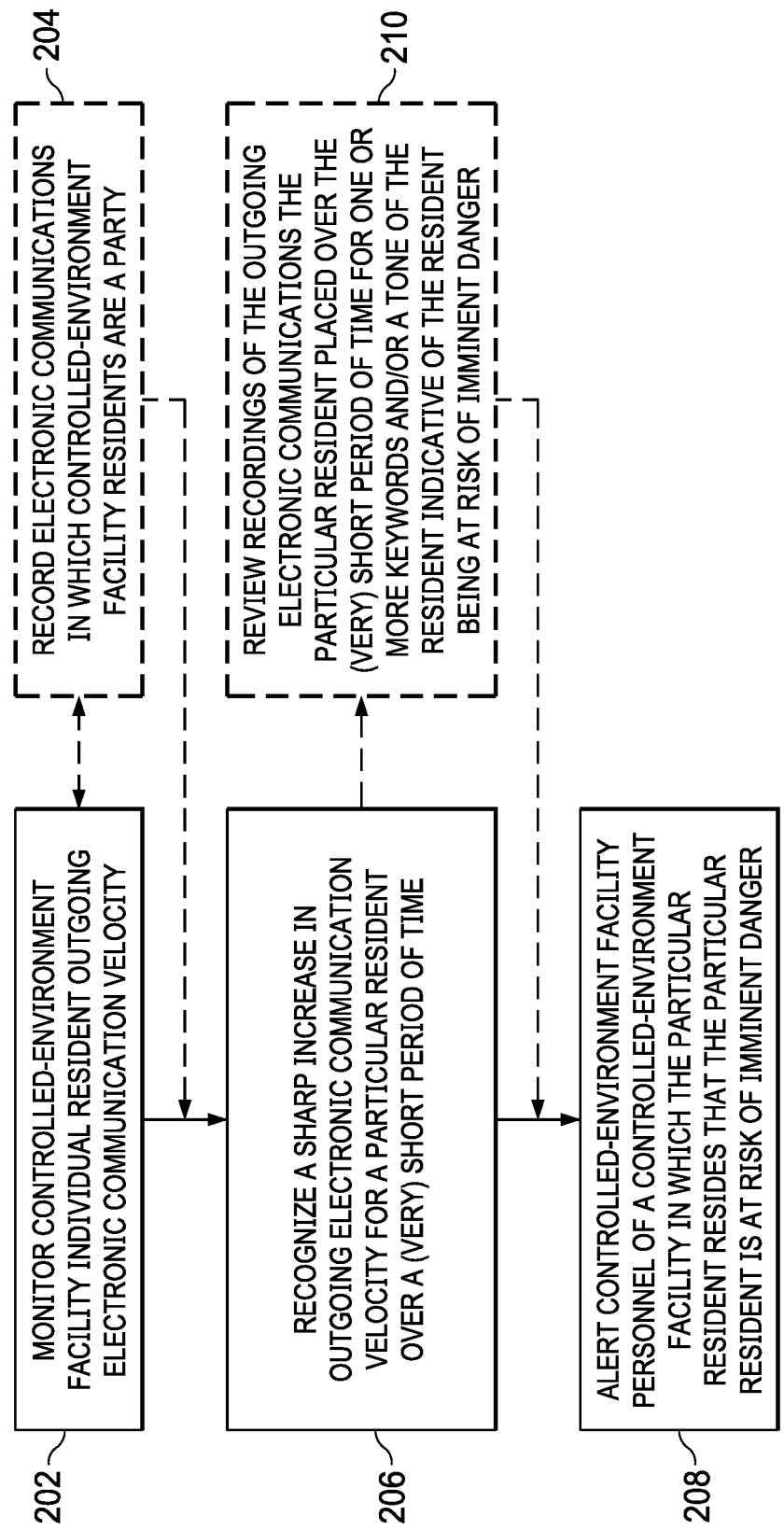
Figure 3:
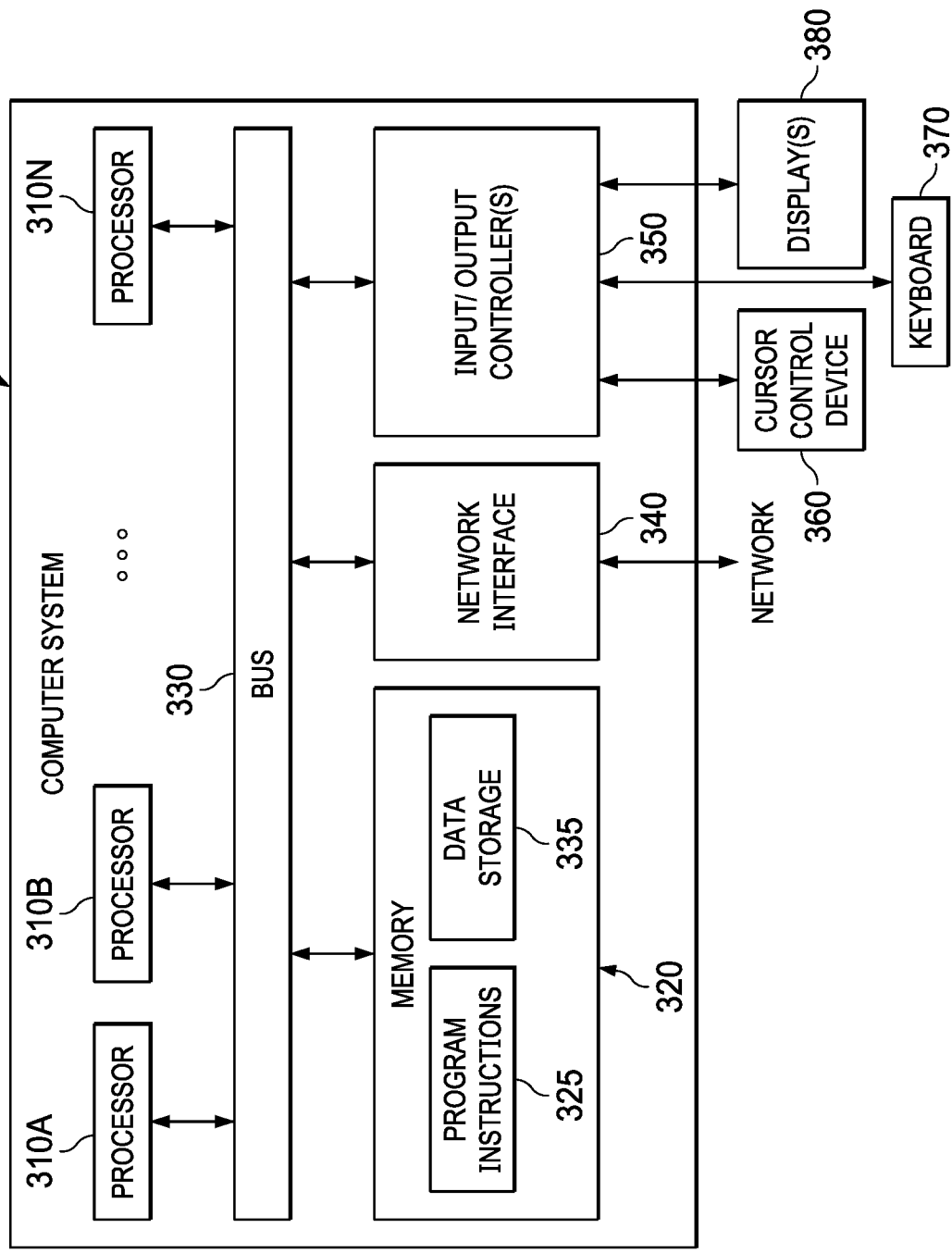

Having thus described the invention in general terms, reference will now be made to the accompanying drawings, which are not necessarily drawn to scale, and wherein:

FIG. 1 is a diagrammatic illustration of an example communications environment, wherein an example embodiment of the present systems and methods for controlled-environment facility resident pattern electronic communication detection, and controlled-environment facility action taken in response thereto, may be deployed, for example with respect to multiple controlled-environment facilities, and/or a single controlled-environment facility, in accordance with some embodiments;

FIG. 2 is a flowchart of an example process for controlled-environment facility resident pattern electronic communication detection, and controlled-environment facility action taken in response thereto, in accordance with some embodiments; and FIG. 3 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to." Also, as used herein, the term(s) "call" or "calls" include eMessaging, video visitation, or any other communication with (e.g., initiated by) a controlled-environment facility resident (inmate), as well as voice (telephone) calls.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

As noted, budgetary pressures in local, state, and federal governments have made it difficult for correctional facilities (as with other controlled-environment facilities in general) to maintain an adequate number of wardens, officers, and other administration personnel. Hence, many correctional facilities are often unable to perform investigations, or other monitoring, with respect to their own inmates. That is, there is not enough staff to monitor all the inmates and even if they could it would be hard to pinpoint a specific inmate at risk of imminent danger, such as suicide. Even absent such restraints facility personnel could not monitor and detect pattern electronic communications, as called for in the present systems and methods. Other imminent danger that may be detected in accordance with embodiments of the present systems and methods may include, by way of example, riots, increase in gang activity, etc.

While, as indicated above, residents of controlled-environment facilities are typically encouraged to communicate, such as through electronic communications, including telephone and video calls, eMessages (texts), emails, and the like, there is currently no process in place to identify potential behavioral markers that could identify a possible suicidal intent, or other psychological or emotional issues.

Embodiments of the present systems and methods automatically search for specific patterns associated with suicidal intent, such as calling a group of telephone numbers within a specific time period. This could indicate a pattern of suicidal tendencies, or other safety activities such as an imminent riot, organized criminal activity. In accordance with embodiments of the present systems and methods, not only may a controlled-environment facility communications provider be able to identify a pattern of electronic communications indicative of a mental health issue, such as contemplation of suicide or other safety concerns, the present systems and methods may also alert the facility in which the resident resides, via email, text, phone, etc., when the pattern is detected. Additionally, an alert may be issued on an electronic communication velocity (email, chat, voice, visitation) which may be limited to one inmate or multiple inmates.

Thus, embodiments of the present systems and methods relate generally to controlled-environment facilities, but more particularly to communications placed by controlled-environment facility residents, and specifically to controlled-environment facility resident pattern communication detection, and controlled-environment facility action taken in response to detection of such a controlled-environment facility resident pattern of communications. In accordance with embodiments of the present systems and methods, a controlled-environment facility secure communication platform, an investigative data aggregation and analysis system, and/or the like may be employed to provide controlled-environment facility resident pattern electronic communication detection systems and methods. Therein, controlled-environment facility individual resident outgoing electronic communication velocity is monitored. This individual resident outgoing electronic communication velocity may be the number of electronic communications placed by a controlled-environment facility resident, to (different) telephone numbers and/or electronic communication addresses over a period of time. A sharp increase in outgoing electronic communication velocity for a particular controlled-environment facility resident over a relatively short period of time may be recognized and controlled-environment facility personnel of a controlled-environment facility in which the particular controlled-environment facility resident resides may be alerted that the particular resident is at risk of imminent danger, such as suicide, in response to recognition of the sharp increase in outgoing electronic communication velocity for the particular resident over the relatively short period of time.

That is, embodiments of the present systems and methods may utilize a pattern analysis tool to detect where inmates (controlled-environment facility residents) communicate with at a group of contacts within a specified time period, and/or the like. For example, embodiments of the present systems and methods may detect when within a twenty-four hour period an inmate (controlled-environment facility resident) contacts ten different unique numbers (emails, chats, text, visitation, phone calls), or if an inmate (resident) cycles through their Pre-Approved Contact (PAC) list, which may also include the resident's Pre-Authorized Number (PAN) list, Pre-Authorized Video List (PVL), or the like, within a specified time frame. The time between the communications to prompt an alert could be pre-specified and thereafter collected and/or analyzed in accordance with embodiments of the present systems and methods.

In accordance with further, or other, embodiments of the present systems and methods, an inmate (controlled-environment facility resident) may have a number of completed electronic communications in a quick succession, which could include the same number or non-resident contact. This could, in accordance with embodiments of the present systems and methods be an indication of a frustrated inmate (resident, who may make threats, may provide intel of a crime he has committed (which may be used for investigative purposes), etc., because the inmate is now frustrated, or may be volatile. In accordance with still further, or other, embodiments the present systems and methods, may (also) recognize an inmate's (controlled-environment facility resident's) voice, through voice recognition, on multiple electronic communications, regardless of inmate identification information used to place the electronic communications, that fit the afore described pattern electronic communication, that thereby indicate an imminent threat, such as a potential for suicidal actions by the inmate (resident). In accordance with even further, or still other, embodiments of the present systems and methods, an imminent threat, such as a potential for suicidal actions by an inmate (controlled-environment facility resident), might also be identified by the inmate's (resident's) pattern of spending money in their commissary account. For example, a spike or complete depletion in inmate (controlled-environment facility resident) commissary funds may indicate an imminent threat, such as a potential for suicidal actions by the inmate (resident). That is, if a particular inmate (resident) usually saves a large portion of their money, then suddenly, they spend all their money, that could indicate an imminent threat, such as a potential for suicidal actions by the inmate (resident).

FIG. 1 is a diagrammatic illustration of an example communications environment, wherein an example embodiment of the present systems and methods for controlled-environment facility resident pattern electronic communication detection, and controlled-environment facility action taken in response thereto, may be deployed, for example with respect to multiple controlled-environment facilities 110, 120, etc., and/or a single controlled-environment facility (130), in accordance with some embodiments. Therein, onsite communication processing system 121, 131, external centralized communication processing system 141, such as may be deployed in a controlled-environment facility communications provider data center (140), or the like may provide telephone services, videoconferencing, online chat, e-messaging, and other communication services to residents of respective controlled-environment facility 110, 120, 130, etc. As illustrated, in some cases, a communication processing system (121, 131) may be co-located with a controlled-environment facility (120, 130, respectively). Alternatively, as also illustrated, a communication processing system (141) may be centrally or remotely located, such as in controlled-environment facility communications provider data center 140 in whole (such as with respect to facility 110) or in part (such as with respect to facility 120). Controlled-environment facility communications provider data center 140, and hence external centralized communication processing system 141, may be connected to such facilities via a public network (e.g. the Internet) or a private network, or the like (e.g. via a secure tunneling protocol over the internet, using encapsulation) (150) and may provide communication services to such multiple controlled-environment facilities. Such controlled-environment facility communication processing systems, particularly when deployed in, or in conjunction with, a controlled-environment facility communications provider data center (140), and/or in conjunction with onsite Administration Management System (AMS) 122, 132 (or a Jail Management System (JMS) in correctional environment embodiments), and/or external centralized AMS 142, may be referred to as a "controlled-environment facility secure communication platform," or the like. More generally, however, it should be noted that communication systems 121, 131, 141, etc. may assume a variety of forms, comprising, including and/or embodying telephony switches, such as electronic switching systems, or the like, and/or and may be configured to serve a variety of facilities and/or users, whether within, or outside of, the respective controlled-environment facility.

Onsite AMS 122, 132 (or a Jail Management System (JMS) in correctional environment embodiments), and/or external centralized AMS 142 may be employed in accordance with various embodiments of the present systems and methods. In other embodiments, where the (central) controlled-environment facility communication system (141) is located remotely with respect to the controlled-environment facility (110, 120, etc.), access to AMS (or JMS) 122, 132, etc. may (also) be obtained via a computer network such as, for example, network 150. In various embodiments, the lives of resident/inmates may be electronically managed from intake/booking through release. An AMS (or JMS) deployed in conjunction with one or more correctional facilities provides management of various aspects thereof, such as facility management (including tracking inmates from booking through release), staff management (including time and attendance management and personnel dispatching), call management (including placing and blocking calls, accounting for call charges, distance commerce, determining credit worthiness of individuals, establishing and maintaining accounts, and handling purchases of goods and services), and inmate/resident management (including managing inmate information and tracking inmate activity). In accordance with embodiments of the present systems and methods, controlled-environment facility AMS 122, 132, etc. (e.g. a JMS with respect to correctional facilities), associated with at least one controlled-environment facility 120, 130 may maintain information with respect to the residents of the respective controlled-environment facility. An external remote, central AMS (142) may maintain information with respect to residents of one or more controlled-environment facilities (e.g. 110, 120). In the context of a correctional facility, the respective JMS or AMS databases may include information such as balances for inmate trust and calling accounts; trial schedule; conviction data; criminal record; sentencing data, time served, time remaining to be served, and release date; cell and cellmate assignments; inmate restrictions and warnings; commissary order history; telephone call history; call recordings made by the facility, or in accordance with present systems and methods; known or suspected gang or criminal affiliations; known or suspected affiliates, accomplices, or gang members; and any other information that may be relevant or useful to correctional facility staff to house and maintain inmates.

In some implementations, wherein the controlled-environment facility communication system (121, 131) is located within the controlled-environment facility (120, 130), it may have direct access to a respective AMS (122, 132) for garnering information used in accordance with various embodiments of the present systems and methods. In addition to providing certain visitation and communication operations, communication processing systems 121, 131, 141, etc. and/or AMS (or JMS) 122, 132, 142, etc. may attempt to ensure that a resident's calls, video conferences, online chats, e-messaging, etc. are performed only with non-residents whose identities, devices, email addresses, phone numbers, etc. are listed in that resident's PAC, PAN and/or PVL lists, or the like. Each resident's PAC, PAN and/or PVL lists, or the like, may be stored, for example, in a database maintained by respective AMS (or JMS) 122, 132 or 142, or the like. In addition to PAC, PAN and/or PVL lists, or the like, AMS (or JMS) 122, 132 or 142 (databases), or the like, may also store inmate or resident profile data (RPD), as well as visitation rules applicable to each inmate or resident, Communication Detail Records (CDRs), or similar records, for resident phone calls, video visitations, texts, online chats, e-messaging, or the like. As detailed below, non-resident telephone numbers maintained in such databases, such as part of the PAC, PAN and/or PVL lists, or the like, may be used in accordance with embodiments of the present systems and methods to detect resident pattern electronic communications, for controlled-environment facility action taken in response thereto, such as for suicide prevention, or the like Residents may use more-or-less conventional telephones 113, 123, 133, or the like to access certain communication services, under control of respective communication processing system 121, 131, 141, etc. In accordance with embodiments of the present systems and methods more-or-less conventional telephones 113, 123, 133 may be camera-enabled, or otherwise associated with controlled-environment facility cameras, or the like. Additionally, or alternatively, in some facilities a resident may use an intelligent controlled-environment facility media and/or communications terminal 114a through 114n, 124a through 124n, 134a through 134n, or the like, to place voice calls, as well as for video visitation, under control of respective communication processing system 131, 141, etc. Such an intelligent controlled-environment facility media and/or communications terminal may be referred to as an Intelligent Facility Device (IFD) (114, 124, 134), which may be a video phone particularly adapted for use in a controlled-environment facility, but which may be used to place voice calls, as well. Alternatively, or additionally, IFDs may take the form of, or be used as, a voice phone that may have a touchscreen interface. Generally speaking, IFDs may be disposed in a visitation room, in a pod, as part of a kiosk, etc. Additionally, or alternatively, in some facilities, residents may also use a personal computer wireless device, such as a tablet computing device 115, 125, 135, smartphone/media player 116, 126, 136, or the like, which may have been adapted and/or approved for use in a controlled-environment facility. Such a tablet computing device or smartphone/media player may be referred to as an intelligent controlled-environment facility resident media and/or communications device, Intelligent Resident Device (IRD), or the like, and in a correctional institution embodiment, as an intelligent inmate media and/or communications device Intelligent Inmate Device (IID), or the like. As will be appreciated, IRDs, IFDs, or other similar devices, as well as phones 113, 123, 133, etc. have communications capabilities, to enable a party to participate in telephone calls, video visitation sessions (video calls), or the like with other call parties, such as non-residents, under control of respective communication processing system 121, 131, 141, etc. IRDs 114a through 114n, 124a through 124n, 134a through 134n, IFDs 114, 124, 134, or other similar devices, may be referred to collectively or individually as "(a) controlled-environment facility communication and/or media device(s)," or the like.

For a resident to initiate an outgoing communication, the resident may initiate telephone services by lifting the receiver on telephone 113, 123,133, etc. or IFD 114, 124, 134, etc. and/or otherwise initiating a call, such as by launching an app on IRD 115, 125, 135, 116, 126, 136, etc.

At which time, the resident may be prompted to provide a PIN, other identifying information or biometrics. Interactive voice response (IVR) unit 127, 137 or 147, which may be integrated into communication processing system 121, 131 and/or 141, as illustrated, may generate and play a prompt or other messages to the resident. Under the control of communication processing system 121, 131 and/or 141, etc. the device may be capable of connecting with a non-resident's device (e.g. telephone 163, non-resident computer 164, non-resident tablet computing device 165, non-resident smartphone/media player 166, or the like) across public network 170, such as a publicly switched telephone network (PSTN), an Integrated Services Digital Network (ISDN), Voice-over-IP (VoIP) or packet data network, such as for example the Internet, etc. Network 170 may be the same, or a different network, as network 150. Telephony switches 128, 138, 148 etc. in respective communication processing system 121, 131, 141, etc. may be used to connect calls across a PSTN (i.e. network 170), such as calls from controlled-environment facility telephone 113, 123 or 133 and non-resident telephone 163, which, in accordance with embodiments of the present systems and methods, may also be camera-enabled. Telephony router 129, 139, 149, etc., media gateway functionality, or the like of respective communication system 121, 131, 141, etc. may be used to route data packets associated with a digital call connection, via an Integrated Services Digital Network (ISDN), the Internet, or the like (i.e. network 170). For example, a non-resident party may have a personal or laptop computer 164 with a webcam, or the like, or devices 165 or 166 may have an integrated camera and display (e.g., a smart phone, tablet, etc.). A network connection between the parties may be established and supported by an organization or commercial service that provides computer services and software for use in telecommunications and/or VoIP, such as SKYPE®. Additionally, or alternatively, the correctional facility and/or the destination may use videoconferencing equipment compatible with ITU H.323, H.320, H.264, and/or V.80, or other suitable standards. In accordance with various embodiments of the present systems and methods, non-resident's devices, telephone 163, non-resident computer 164, non-resident tablet computing device 165, non-resident smartphone/media player 166, and/or the like, may be disposed in the non-resident's home, place of work, on their person, or the like. Additionally, or alternatively the non-resident devices may be disposed in a visitation area of controlled-environment facility 110, 120, 130, etc., which may be within, adjacent to, or remote with respect to controlled-environment facility 110, 120, 130, etc., itself.

In accordance with various embodiments of the present systems and methods, a controlled-environment communication apparatus that may monitor the velocity of the placement of electronic communications by a resident may take the form of central and/or onsite controlled-environment facility communication management system 140, and/or 121 or 131, respectively, such as in conjunction with controlled-environment facility AMS 122, 132 and/or 142, to implement a controlled-environment facility secure communication platform, or the like. Additionally, or alternatively, intelligent controlled-environment facility communication devices, such as IFDs 114, 124, 134, etc. and/or residents IIDs 115, 125, 135, 116, 126, 136, etc. may be employed to facilitate implementation of embodiments of the present systems and methods, and/or to carry out certain aspects of embodiments of the present systems and methods, such as to monitor the velocity of the placement of electronic communications by the resident using the device.

Centralized investigative data aggregation and analysis system 190 may be a platform for providing investigative tools. Such investigative tools may provide collection, processing, analysis, and/or reporting of information for intelligence purposes. In some embodiments, the investigative tools may provide functions such as entity linkage analysis, communication statistics, organization analysis, communication behavior analysis, subscription usage analysis, common communication analysis, timelines, correlations, mapping, word search, language translation (whether machine translation or access to translation services), call recording (whether terminated external to the controlled-environment facility or internally thereto), call notification, call monitoring (whether real-time or recorded, and whether monitoring a particular call or a plurality of calls), call "barging," call control, visitation monitoring/background checking, crime tip conduit, account activity monitoring (whether tracing deposits and expenditures of monies or monitoring account trends and behavior, such as velocity of transactions), multiple database querying, and resource integration, and/or the like. One or more of these investigative tools may be provided through an intuitive user interface to provide ease of use, facilitate operation across a variety of user terminals, and/or to facilitate remote access to one or more features thereof. For example, in some cases, a web-based portal enabling individuals to store and transmit information, including forensic tools that analyze communications into and out of controlled-environment facilities to assist law enforcement may be provided. Such a web page portal may have menus comprising an investigator dashboard, to present and facilitate execution of various investigative operations. These investigative tools may log calls (e.g., as CDRs), so that an investigator may research them through an archive and may be provided access to internal and/or external criminal databases and/or other sources of useful information. Word spotting or recognition may also assist investigators with pertinent data and or notifications (may include word recognition or word spotting of text). Notifications may allow quick response to imminent threat situations, including potential suicide.

Computer-based environment components may include programming and/or hardware to implement embodiments of the present systems and methods. This programming may take the form of stored program instructions, programmed firmware, or the like, while hardware might take the form of an Application Specific Integrated Circuit (ASIC), or the like, to carry out such aspects of embodiments of the present systems and methods.

Embodiments of the present systems and methods may be employed in above-described environment 100, such as in a manner described below, with respect to FIG. 2, a flowchart of example implementation 200 of controlled-environment facility resident pattern electronic communication detection, and controlled-environment facility action taken in response thereto. Therein, at 202, a controlled-environment facility secure communication platform (controlled-environment facility communication processing system 121, 131 and/or 141, and in some embodiments, controlled-environment facility AMS 122, 132 and/or 142), or the like, monitors controlled-environment facility individual resident outgoing electronic communication velocity. In accordance with some embodiments of the present systems and methods, such monitoring may be carried out, supplemented or otherwise facilitated by (a) controlled-environment facility communication and/or media device(s) (114, 115, 116, 124, 125, 126, 134, 135, 136, etc.), or the like. The individual resident outgoing electronic communication velocity may be the number of electronic communications placed by a resident, to (different) telephone numbers over, a given period of time. These communications may be carried out with telephone numbers or other communications addresses that are from the particular controlled-environment facility resident's PAC list, which may include the resident PAC list, PAN list, and PVL, or the like. These PAC, PAN and/or PVL lists, or the like, may, as described above, be maintained by a controlled-environment facility AMS (122, 132 and/or 142), or the like.

Additionally, at 204, after 202, before 202, or concurrently therewith, the controlled-environment facility secure communication platform, a centralized investigative data aggregation and analysis system (190), or the like, may record, and store, electronic communications in which controlled-environment facility residents are a party.

In accordance with embodiments of the present systems and methods, the controlled-environment facility secure communication platform, or the like, at 206 recognizes any sharp increase in outgoing electronic communication velocity for a particular resident, such as may occur over a (very) short period of time. In various embodiments, this very short period of time may be relative, such as over a period of time that is some fraction of time over which the particular resident normally contacts multiple parties, or it may be (a) fixed, predetermined time frame(s), such as an hour or less, a day or less, etc. Such a recognition may occur when the resident has contacted, or otherwise communicated with all, or practically all parties on the resident's PAC, PAN and/or PVL lists, or the like, or depending on the velocity of the contacts, once the resident has contacted a significant portion of the resident's PAC, PAN and/or PVL lists, or the like. This recognition may be dynamic in that the controlled-environment facility secure communication platform, or the like may adjust a time window, number of contacts, percent of the PAC, PAN and/or PVL lists called, and/or the like to balance these factors to determine when an increase in outgoing electronic communication velocity for a particular resident is sharp enough to be indicative of suicidal tendencies or imminent danger in the particular resident and/or otherwise warrant an controlled-environment facility alert.

As noted, in accordance with some embodiments of the present systems and methods, an inmate (controlled-environment facility resident) may have a number of completed electronic communications in a quick succession, which could include the same number or non-resident contact. This could, in accordance with such embodiments of the present systems and methods be an indication of a frustrated inmate (resident), who may make threats, may provide intel of a crime he has committed (which may be used for investigative purposes), etc., because the inmate is now frustrated, or may be volatile.

At 208, the controlled-environment facility secure communication platform, or the like may alert controlled-environment facility personnel of a controlled-environment facility in which the particular resident resides that the particular resident is at risk of suicide, or other imminent danger, as a result of recognition at 206 of a sharp increase in outgoing electronic communication velocity for the particular resident over the (very) short period of time. The alert at 208 may be in the form of a call, a text message, an email, etc. transmitted to, or displayed on a controlled-environment facility personnel smartphone, tablet computing device, computer terminal, or the like, such as in a dashboard user interface. Such a dashboard may be provided to personnel associated with the controlled-environment facility via a centralized investigative data aggregation and analysis system, or the like, in some embodiments. Regardless, the display may include indication of a (suspicion) index of the likelihood of intent of suicide or abnormal event by the particular resident which may indicate a security concern. This index may, at least in part, be based on a volume and/or velocity of the outgoing electronic communications placed by the particular resident over the (very) short period of time, and/or on a percentage of a PAC, PAN and/or PVL lists, or the like, of the particular resident that the resident has called or otherwise communicated with over the (very) short period of time. Additionally, the time frame over which the particular resident contacted the parties may be taken into account in establishing the index. For example if the contacts took place over an extremely short period of time, such as on hour or two, or even less, the likelihood index that the resident has an intent to commit suicide may be very high, while if the contacts took place over a twenty-four hour period, or the like the index may be lower.

Additionally, at 210, or before the alert at 208 (such as concurrently with, or after, 206), the controlled-environment facility secure communication platform, or the like, may review recordings of the outgoing electronic communications the particular resident placed over the (very) short period of time for one or more keywords indicative of the particular resident being at risk of suicide and/or for a tone of the particular resident indicative of the particular resident being at risk of suicide. Additionally, embodiments of the present systems and methods may monitor for keywords or phrases known to investigators that translate to gang activity, riot, escape, fighting, etc. In accordance with some embodiments of the present systems and methods, review recordings may be carried out in response to recognition of the sharp increase in outgoing electronic communication velocity for the particular resident over the (very) short period of time at 206. The one or more keywords indicative of the particular resident being at risk of suicide may be one or more predefined keywords. Such keyword(s) may be predefined by controlled-environment facility personnel, or the like, via a controlled-environment facility administration and management system interface provided by a controlled-environment facility AMS, or the like. The aforementioned tone of the particular resident indicative of the particular resident being at risk of suicide may be detected by analyzing audio of the recordings of the outgoing electronic communications to detect a change in an audio volume level of the audio that indicates an occurrence of a potential event of interest.

As noted, in accordance with some embodiments, the present systems and methods may (also) recognize an inmate's (controlled-environment facility resident's) voice, through voice recognition, on multiple electronic communications, regardless of inmate identification information used to place the electronic communications. These electronic communications may be analyzed, such as in accordance with 206 and/or 210, above, to determine if they fit pattern electronic communications, that thereby indicate an imminent threat, such as a potential for suicidal actions by the inmate (resident).

A determination of a significant audio volume level change at 210 may be based, at least in part, on each communication individually, the controlled-environment facility secure communication platform, or the like, may create one or more respective audio streams for the participants of the communication. A "significant audio volume level change" does not necessarily mean a change in audio volume level that is of a particular magnitude, but includes an audio volume level change that can be indicative of an event of interest (e.g., "significant") during a communication. Each audio stream may isolate when one respective participant is speaking during the communication, and may remove or filter any background noise from the communication. A window is used to determine an average decibel (dB) level at which that respective participant is speaking during the communication. The window can be defined, for an on-going and/or concluded communication, from a beginning of the audio stream up to the instance in time that is being analyzed to detect a potential audio volume level change. The window can instead be defined, for an on-going and/or concluded communication, as some predefined duration preceding the instance in time that is being analyzed to detect a potential audio volume level change. In a concluded communication, the window can be defined as an entirety of the audio stream or some subset thereof. When determining the average dB level, periods of silence by the respective participant can be excluded so that various durations of silence do not adversely impact the average determination. With the average dB level determined, a difference between the average dB level and the dB level of the audio stream at the instance in time that is being analyzed to detect a potential audio volume level change is determined. If the magnitude of the determined difference exceeds some threshold, a significant audio volume level change is detected. The threshold can be some predefined dB amount, a percentage of the average dB level, some amount of a standard deviation of the dB level in the window, or another amount.

In another example, to determine a significant audio volume level change based on the communication individually, the controlled-environment facility secure communication platform, or the like, may likewise create one or more respective audio streams for the participants of the communication. Each audio stream may isolate when one respective participant is speaking during the communication while excluding periods of silence, and may remove or filter any background noise from the communication. The controlled-environment facility secure communication platform, or the like, can determine a rate of change in dB (e.g., by identifying a derivative of the dB of the audio stream). When the rate of change exceeds a predefined value or other amount, for example, a significant audio volume level change can be detected.

To determine a significant audio volume level change based on some number of previous communications, in some examples, a signature profile can be created based on the previous communications that is compared to the communication that is being analyzed for a potential significant audio volume level change. For example, using previous communications, respective average audio volume levels of an audio stream may be determined for each audio stream of each communication (e.g., while excluding periods of silence), and the audio volume levels of each audio stream can be normalized using its average audio volume level. By normalizing the audio volume levels, various variables may be removed, such as ability of a microphone to pick up sound, distance the person speaking has the microphone from the person's mouth, etc. Known significant audio volume level changes in the normalized audio volume levels can be used to identify attributes of significant audio volume level changes to create the signature profile. For example, the differences in audio volume levels can be averaged to obtain an averaged, normalized difference indicative of a significant audio volume level change; percentages of the differences with respect to the average corresponding to the difference can be averaged to obtain a percentage change indicative of a significant audio volume level change; and/or other techniques. Any one or more attributes indicative of a significant audio volume level change can be included in or be the signature profile. The signature profile can be specific to a participant, e.g., the resident participating in the communication, by analyzing previous communications of that participant, such as by isolating audio streams of that participant as described above. In such a scenario, the signature profile can be stored in a database, such as part of account information of that participant stored in the database 115. In other examples, the signature profile can be global to any participant, such as by isolating audio streams of a number of different participants of previous communications.

The controlled-environment facility secure communication platform, or the like, can compare the signature profile to an on-going or concluded communication to determine if a significant audio volume level change occurred in the communication. For example, the controlled-environment facility secure communication platform, or the like, may create one or more respective audio streams for the participants of the communication. Each audio stream may isolate when one respective participant is speaking during the communication, and may remove or filter any background noise from the communication. Each audio stream may be processed based on the format of the signature profile and/or the technique of the comparison. For example, if the signature profile is based on an averaged, normalized difference, the audio stream may be normalized based on a window (e.g., a portion of preceding audio stream if the communication is on-going, or an entirety of the audio stream if the communication is concluded) to then determine a normalized difference of the audio stream that is compared to the averaged, normalized difference of the signature profile. A significant audio volume level change can be identified at the instance being analyzed when the magnitude of the normalized difference exceeds the averaged, normalized difference of the signature profile. In other examples, the audio stream may be compared to the signature profile using a correlation technique, and a significant audio volume level change can be identified when the correlation technique indicates a strong correlation between the instance of the audio stream being analyzed and the signature profile.

In further examples, to determine a significant audio volume level change based on some number of previous communications, the controlled-environment facility secure communication platform, or the like, may implement a machine learning algorithm, such as an Artificial Neural Network (ANN), Support Vector Machine (SVM), and/or other algorithms. Audio streams from previous communications may be classified as positive classification (a significant audio volume level change) or a negative classification (not a significant audio volume level change), such as by human analysis. The positive and negative classifications can then be used by the machine learning algorithm to create a structure to identify positive and negative instances in audio streams. The audio streams from the previous communications may be specific to one person and/or may be based on audio streams from multiple people. Using the machine learning algorithm, the controlled-environment facility secure communication platform, or the like, may process isolated audio streams of on-going and/or concluded communications to identify a positive instance (where a significant audio volume level change occurs) and a negative instance (where a significant audio volume level change does not occur).

When the controlled-environment facility secure communication platform, or the like, detects a significant audio volume level change, the controlled-environment facility secure communication platform, or the like, can adjust the aforementioned index or otherwise inform controlled-environment facility personnel, such as, as part of the alert at 208 or in a further alert.

The alert, or the like may include an indication as to whether the significant audio volume level change was an increase or decrease in audio volume level. The alert can additionally, or alternately, include, for example, a time stamp indicating where in a recording of the communication that the significant audio volume level change occurred and/or a pointer to a location in an electronic file of the recording of the communication where the significant audio volume level change occurred. The pointer may enable authorized personnel to, for example, click a link, control, or button in a user interface on a computer system that starts replay of the recording of the communication via the user interface at the instance in the communication where the significant audio volume level change occurred.

If the alert is transmitted while the communication(s) is (are) on-going, the device of the authorized personnel may be communicatively coupled to the on-going communication(s), such as by being conferenced into a telephone call or by accessing the communication through a user interface of the controlled-environment facility secure communication platform, or the like. The device of the authorized personnel may be enabled to remotely listen to the communication while being muted, to barge into the communication to speak to one or more of the participants (which may mute communications to another participant), and/or other actions. If the alert is transmitted while the communication(s) is (are) on-going and/or after the communication(s) has (have) concluded, the alert may indicate to the authorized personnel which communication contained a significant audio volume level change for review.

Embodiments of the present systems and methods provide quicker intervention of suicidal inmates (controlled-environment facility residents) as well as an awareness to the controlled-environment facility that a (root) problem exists. For example, if the facility observes a great number of alerts in accordance with the present systems and methods, then there could be bullying or corruption occurring in the facility.

In accordance with some (other) embodiments of the present systems and methods, an imminent threat, such as a potential for suicidal actions by an inmate (controlled-environment facility resident), might also be identified by the inmate (resident) pattern of spending money in their commissary account. For example, a spike or complete depletion in inmate (controlled-environment facility resident) commissary funds may indicate an imminent threat, such as a potential for suicidal actions by the inmate (resident). That is, if a particular inmate (resident) usually saves a large portion of their money, then suddenly, they spend all their money, that could indicate an imminent threat, such as a potential for suicidal actions by the inmate (resident).

Embodiments of the present systems and methods for controlled-environment facility resident pattern electronic communication detection, and controlled-environment facility action taken in response thereto, as described herein, may be implemented at least in part as, or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200 described above with respect to FIG. 2, and/or a computer system such as computer system 300 may be used as, or as part of, one or more of: controlled environment facility communications management systems 121, 131 and/or 141; AMSs 122, 132 and/or 142; centralized investigative data aggregation and analysis system 190; controlled-environment facility resident communications devices 113 through 116, 123 through 126, and 133 through 136; non-resident communications devices 163 through 166; and/or the like. In various embodiments two or more of these computer systems may be configured to communicate with each other in any suitable way, such as, for example, via public network 170, which may be the Internet, or the like, as discussed above, via a local area network using wired or wireless functionality, etc.

As illustrated, computer system 300 includes one or more processors 310A-N coupled to a system memory 320 via bus 330. Computer system 300 further includes a network interface 340 coupled to bus 330, and one or more I/O controllers 350, which in turn are coupled to peripheral devices such as cursor control device 360, keyboard 370, display(s) 380, etc. Each of I/O devices 360, 370, 380 may be capable of communicating with I/O controllers 350, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 300 may be a single-processor system including one processor 310A, or a multi-processor system including two or more processors 310A-N (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or another dedicated graphics-rendering device.

System memory 320 may be configured to store program instructions and/or data accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 320 as program instructions 325 and data storage 335, respectively. In other embodiments, program instructions and/or data may be received, sent, or stored upon different types of computer-accessible media or on similar media separate from system memory 320 or computer system 300.

A computer-accessible medium may include any tangible and/or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the computer system, including network interface 340 or other peripheral interfaces, such as I/O devices 360, 370, 380. In some embodiments, bus 330 may perform any necessary protocol, timing, or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

As shown in FIG. 3, system memory 320 may include program instructions 325, configured to implement certain embodiments described herein, and data storage 335, comprising various data may be accessible by program instructions 325. In an embodiment, program instructions 325 may include software elements, which may be configured to affect the operations discussed in FIGS. 1 through 3. Program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein, particularly in connection with FIGS. 1 through 3, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controlled-environment facility resident pattern electronic communication detection system comprising:
   a controlled-environment facility secure communication platform comprising:
     at least one processor; and
     a memory coupled to the processor, the memory having program instructions stored thereon that, upon execution by the processor, cause the controlled-environment facility secure communication platform to:
       monitor controlled-environment facility individual resident outgoing electronic communication velocity, said individual resident outgoing electronic communication velocity comprising the number of electronic communications placed by a controlled-environment facility resident, to telephone numbers and/or electronic communication addresses over a period of time;

recognize a sharp increase in outgoing electronic communication velocity for a particular controlled-environment facility resident over a relatively short period of time; and alert controlled-environment facility personnel of a controlled-environment facility in which the particular controlled-environment facility resident resides that the particular controlled-environment facility resident is at risk of imminent danger, in response to recognition of the sharp increase in outgoing electronic communication velocity for the particular controlled-environment facility resident over the relatively short period of time.

2. The system of claim 1, wherein the imminent danger is imminent danger of suicide by the particular controlled-environment facility resident.

3. The system of claim 1, wherein the controlled-environment facility secure communication platform comprises at least one controlled-environment facility communication processing system.

4. The system of claim 1, wherein the controlled-environment facility secure communication platform comprises at least one controlled-environment facility administration management system.

5. The system of claim 1, wherein the telephone numbers and/or electronic communication addresses are telephone numbers and/or electronic communication addresses from a pre-approved contact list, pre-authorized number list and/or pre-authorized video list of the particular controlled-environment facility resident.

6. The system of claim 5, wherein the pre-approved contact list, pre-authorized number list and/or pre-authorized video list is maintained by a controlled-environment facility administration management system.

7. The system of claim 1, wherein the controlled-environment facility secure communication platform program instructions further cause the controlled-environment facility secure communication platform to, as at least a part of the alert, display an index of likelihood of imminent danger by the particular controlled-environment facility resident, based at least in part on a volume and/or velocity of the outgoing electronic communications placed by the particular controlled-environment facility resident over the relatively short period of time.

8. The system of claim 1, wherein the controlled-environment facility secure communication platform program instructions further cause the controlled-environment facility secure communication platform to, as at least a part of the alert, display an index of likelihood of imminent danger by the particular controlled-environment facility resident, based at least in part on a percentage of a pre-approved contact list, pre-authorized number list and/or pre-authorized video list of the particular controlled-environment facility resident that the particular controlled-environment facility resident has initiated electronic communications with over the relatively short period of time.

9. The system of claim 1, wherein the controlled-environment facility secure communication platform program instructions further cause the controlled-environment facility secure communication platform to:

record electronic communications in which controlled-environment facility residents are a party; and review, in response to recognition of the sharp increase in outgoing electronic communication velocity for the particular controlled-environment facility resident over the relatively short period of time, recordings of the outgoing electronic communications the particular controlled-environment facility resident placed over the relatively short period of time for one or more keywords indicative of the particular controlled-environment facility resident being at risk of imminent danger.

10. The system of claim 1, wherein the controlled-environment facility secure communication platform program instructions further cause the controlled-environment facility secure communication platform to:

record electronic communications in which controlled-environment facility residents are a party; and review, in response to recognition of the sharp increase in outgoing electronic communication velocity for the particular controlled-environment facility resident over the relatively short period of time, recordings of the outgoing electronic communications the particular controlled-environment facility resident placed over the relatively short period of time for tone of the particular controlled-environment facility resident indicative of the particular controlled-environment facility resident being at risk of imminent danger.

11. The system of claim 10, wherein, reviewing recordings of the outgoing electronic communications the particular controlled-environment facility resident placed over the relatively short period of time for tone of the particular controlled-environment facility resident indicative of the particular controlled-environment facility resident being at risk of imminent danger, further comprises analyzing audio of the recordings of the outgoing electronic communications to detect a change in an audio volume level of the audio that indicates an occurrence of a potential event of interest indicative of a risk of imminent danger.

12. A controlled-environment facility resident pattern electronic communication detection method comprising:

monitoring, by a controlled-environment facility secure communication platform, controlled-environment facility individual resident outgoing electronic communication velocity, said individual resident outgoing electronic communication velocity comprising the number of electronic communications placed by a controlled-environment facility resident, to telephone numbers and/or electronic communication addresses over a period of time;

recognizing, by the controlled-environment facility secure communication platform, a sharp increase in outgoing electronic communication velocity for a particular controlled-environment facility resident over a relatively short period of time; and alerting, by the controlled-environment facility secure communication platform, in response to recognizing the sharp increase in outgoing electronic communication velocity for the particular controlled-environment facility resident over the relatively short period of time, controlled-environment facility personnel of a controlled-environment facility in which the particular controlled-environment facility resident resides that the particular controlled-environment facility resident is at risk of imminent danger.

13. The method of claim 12, wherein the imminent danger is imminent danger of suicide by the particular controlled-environment facility resident.

14. The method of claim 12, wherein the controlled-environment facility secure communication platform comprises at least one controlled-environment facility communication processing system and/or at least one controlled-environment facility administration management system.

15. The method of claim 12, wherein the telephone numbers and/or electronic communication addresses are telephone numbers and/or electronic communication addresses from a pre-approved contact list, pre-authorized number list and/or pre-authorized video list of the particular controlled-environment facility resident.

16. The method of claim 15, wherein the pre-approved contact list, pre-authorized number list and/or pre-authorized video list is maintained by a controlled-environment facility administration management system.

17. The method of claim 12, wherein the alert comprises display of an index of likelihood of imminent danger by the particular controlled-environment facility resident, based at least in part on a volume and/or velocity of the outgoing electronic communications placed by the particular controlled-environment facility resident over the relatively short period of time.

18. The method of claim 12, wherein the alert comprises display of an index of likelihood of imminent danger by the particular controlled-environment facility resident, based at least in part on a percentage of a pre-approved contact list, pre-authorized number list and/or pre-authorized video list of the particular controlled-environment facility resident that the particular controlled-environment facility resident has initiated electronic communications with over the relatively short period of time.

19. The method of claim 12, further comprising:
recording, by the controlled-environment facility secure communication platform, electronic communications in which controlled-environment facility residents are a party; and
reviewing, by the controlled-environment facility secure communication platform, in response to recognizing the sharp increase in outgoing electronic communication velocity for the particular controlled-environment facility resident over the relatively short period of time, recordings of the outgoing electronic communications the particular controlled-environment facility resident placed over the relatively short period of time for one or more keywords indicative of the particular controlled-environment facility resident being at risk of imminent danger.

20. The method of claim 12, further comprising:
recording, by the controlled-environment facility secure communication platform, electronic communications in which controlled-environment facility residents are a party; and
reviewing, by the controlled-environment facility secure communication platform, in response to recognizing the sharp increase in outgoing electronic communication velocity for the particular controlled-environment facility resident over the relatively short period of time, recordings of the outgoing electronic communications the particular controlled-environment facility resident placed over the relatively short period of time for tone of the particular controlled-environment facility resident indicative of the particular controlled-environment facility resident being at risk of imminent danger.

21. The method of claim 20, wherein reviewing recordings of the outgoing electronic communications the particular controlled-environment facility resident placed over the relatively short period of time for tone of the particular controlled-environment facility resident indicative of the particular controlled-environment facility resident being at risk of imminent danger further comprises analyzing audio of the recordings of the outgoing electronic communications to detect a change in an audio volume level of the audio that indicates an occurrence of a potential event of interest indicative of a risk of imminent danger.

22. A computer readable non-transitory medium having program instructions stored thereon that upon execution by a controlled-environment facility secure communication platform, cause the controlled-environment facility secure communication platform to:
monitor controlled-environment facility individual resident outgoing electronic communication velocity, said individual resident outgoing electronic communication velocity comprising the number of electronic communications placed by a controlled-environment facility resident, to telephone numbers and/or electronic communication addresses over a period of time;
recognize a sharp increase in outgoing electronic communication velocity for a particular controlled-environment facility resident over a relatively short period of time; and
alert controlled-environment facility personnel of a controlled-environment facility in which the particular controlled-environment facility resident resides that the particular controlled-environment facility resident is at risk of imminent danger, in response to recognition of the sharp increase in outgoing electronic communication velocity for the particular controlled-environment facility resident over the relatively short period of time.

* * * * *